United States Patent [19]
Rowland-Hill

[11] 3,994,303
[45] Nov. 30, 1976

[54] AXIAL FLOW COMBINE HAVING CONICAL AUGERS

[75] Inventor: Edward W. Rowland-Hill, Lancaster, Pa.

[73] Assignee: Sperry Rand Corporation, New Holland, Pa.

[22] Filed: Nov. 17, 1975

[21] Appl. No.: 632,547

[52] U.S. Cl. .............................. 130/27 T
[51] Int. Cl.² .................. A01F 12/18; A01F 7/06
[58] Field of Search ............... 130/27 T, 27 R; 56/14.6

[56] References Cited
UNITED STATES PATENTS 3,794,047  2/1974  Coene et al. ............... 130/27 T
3,827,443  8/1974  Drayer ........................ 130/27 T Primary Examiner—Russell R. Kinsey
Attorney, Agent, or Firm—C. Hercus Just; Frank A. Seemar; John R. Flanagan

[57] ABSTRACT

An axial flow type combine provided with twin rotors having rasp bars thereon rotatable within cylindrical compartments partly comprised of concaves for coaction with said rasp bars, the forward ends of said rotors having conical augers mounted thereon and rotatable therewith respectively in opposite directions, the largest diameter of said augers being outermost and portions of said augers being in overlapping relationship with respect to each other to improve the feeding of cut grain material to said rotors and concaves of the combine.

9 Claims, 3 Drawing Figures

3,994,303

AXIAL FLOW COMBINE HAVING CONICAL AUGERS

CROSS-REFERENCE TO RELATED APPLICATIONS

The present invention comprises additions to and improvements over the subject matter of co-pending applications Ser. Nos. 561,406, filed Mar. 24, 1974 and now U.S. Pat. No. 3,939,847; 560,266, filed Mar. 20, 1975 and now U.S. Pat. No. 3,964,492; and 558,506, filed Mar. 14, 1975 and now U.S. Pat. No. 3,971,195.

BACKGROUND OF THE INVENTION

It is the general objective of combines of the axial flow type to render them as universal as possible for purposes of harvesting a number of different types of crops somewhat widely varying in characteristics, size of the grain product, type of vines or stalks encountered by the feeding and threshing mechanism, as well as the type of crop cutting and consolidating mechanism which delivers the cut crops to the threshing means of the combine. The advent of axial flow type combines into the harvesting industry is of relatively recent vintage and there appear to be two principal types. One of these types comprises a single longitudinally extending rotor and cooperating threshing equipment in the machine. A typical example of this type of combine is illustrated in U.S. Pat. No. 3,827,443, dated Aug. 6, 1974, in the name of Drayer. A second type of axial flow combine comprises a pair of longitudinally extending rotors mounted in the machine and cooperable with stationary threshing means and typical examples of this type of combine are illustrated in the following patents:

| | | |
|---|---|---|
| 3,626,472 | Rowland - Hill | Dec. 7, 1971 |
| 3,648,710 | Rowland - Hill | March 14, 1972 |
| 3,742,686 | Rowland - Hill | July 3, 1973 |
| 3,848,609 | Mortiner et al | Nov. 19, 1974 |

Incident to expanding the use of axial flow type combines, it has been found, frequently, that relatively small differences produce very substantial improvements and advantages over prior devices not including such changes. Examples of this are represented in the foregoing list of patents in which the instant applicant is either the sole inventor or a co-inventor with others.

It also can be appreciated that in providing a combine capable of handling efficiently and successfully a substantial variety of different types of crops ranging, for example, to corn harvested in stalk condition, soybeans, wheat and other similar grain crops, as well as rice, feeding of the same to the threshing mechanism provides substantial problems and the present invention effectively solves some of those problems and especially improves efficiency in the feeding capacity of the combine to a substantially greater extent than is possible with the mechanisms included in the prior art, including the above-listed patents. Details of such improvements are described hereinafter.

SUMMARY OF THE INVENTION

It is the principal object of the present invention to provide an axial flow type combine, which includes a pair of similar rotors operable within compartments defined by arcuate shields and concaves, with augers mounted on the forward ends of the rotors and coacting with each other in at least partially overlapping relationship so as to increase the feeding capacity relative to the operative space in which said feeding occurs and also reduce the dead areas which frequently occur in auger mechanisms employed in axial flow type combines.

It is another object of the invention to utilize a pair of converging augers, the largest ends of which are outermost and at least the outermost flighting portions of said augers operating in overlapping relationship so as to provide said improved feeding function of the combine.

It is a further object of the invention to employ such partially overlapping augers on said rotors so as to enable said feeding to occur relatively close to the ground from which the crops are harvested, and said rotors to which the augers are attached being of a relatively standard diameter which is less than the greatest diameter of the augers.

Details of the foregoing objects and of the invention, as well as other objects thereof, are set forth in the following specification and illustrated in the accompanying drawings comprising a part thereof.

DETAILED DESCRIPTION OF THE DRAWINGS

DETAILED DESCRIPTION

Figure 1:
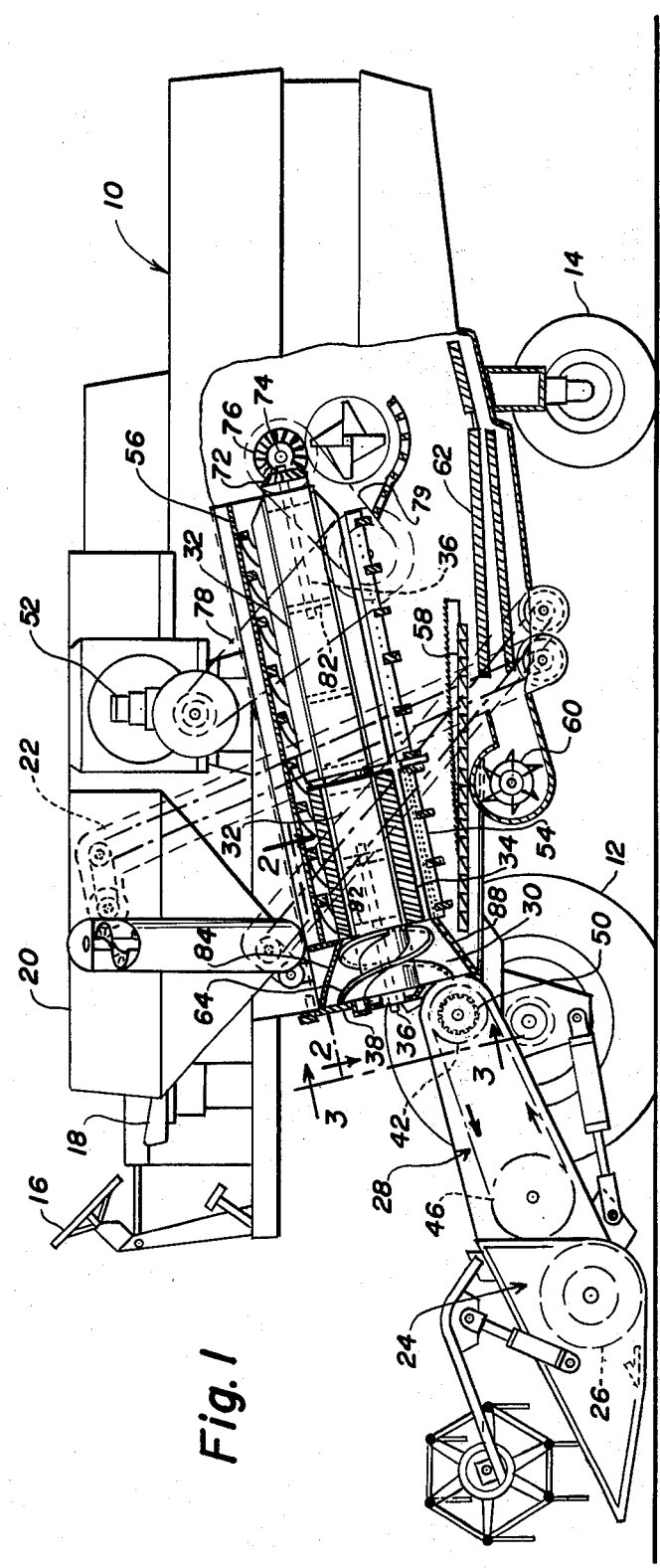
FIG. 1 is a side elevation of an exemplary axial flow type combine to which the present invention pertains and particularly the threshing components of said combine being illustrated in vertical sectional elevation to illustrate details thereof.

Referring to FIG. 1, the exemplary illustration of an axial flow type combine illustrated therein comprises an enclosing housing 10, part of which comprises a main frame which is supported by a pair of forward, large traction wheels 12 which respectively are spaced transversely apart, and a pair of smaller, steering wheels 14 mounted rearwardly of the housing 10 and adapted to be steered by a forward steering wheel 16 which is operated by an operator when seated upon the seat 18. The combine shown in said figure also includes a grain bin 20 into which the harvested grain is elevated by an elevator 22.

Mounted forwardly of the combine is an exemplary header 24 which includes both cutter means and a consolidating auger 26 which delivers cut crops to an elevator 28 which extends between the traction wheels 12, the flexible belt and transverse bars of said elevator, which are represented by phantom lines, being driven in the direction of the arrows illustrated in FIG. 1 for purposes of feeding the cut crop material in an undershot manner onto a feed ramp at the underside of the auger compartment 30 which comprises the principle feature of the present invention and details thereof are described hereinafter.

Figure 2:
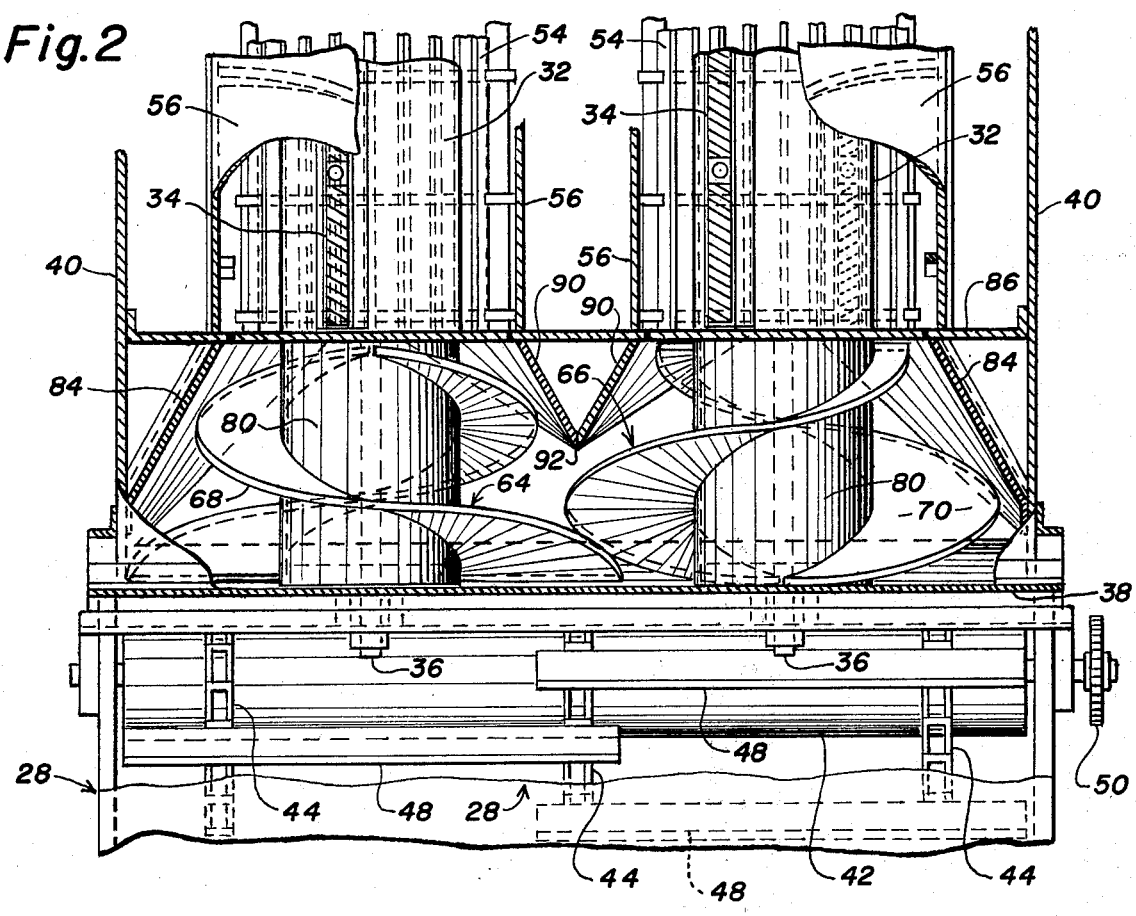
FIG. 2 is a fragmentary, further enlarged horizontal sectional view showing in particular the forward portion of the feeding and threshing mechanism illustrated in FIG. 1 as seen on the line 2—2 thereof and a portion of the housing and shield structure of the mechanism illustrated in FIG. 2 further being broken away to reveal other details of the mechanism.
Figure 3:
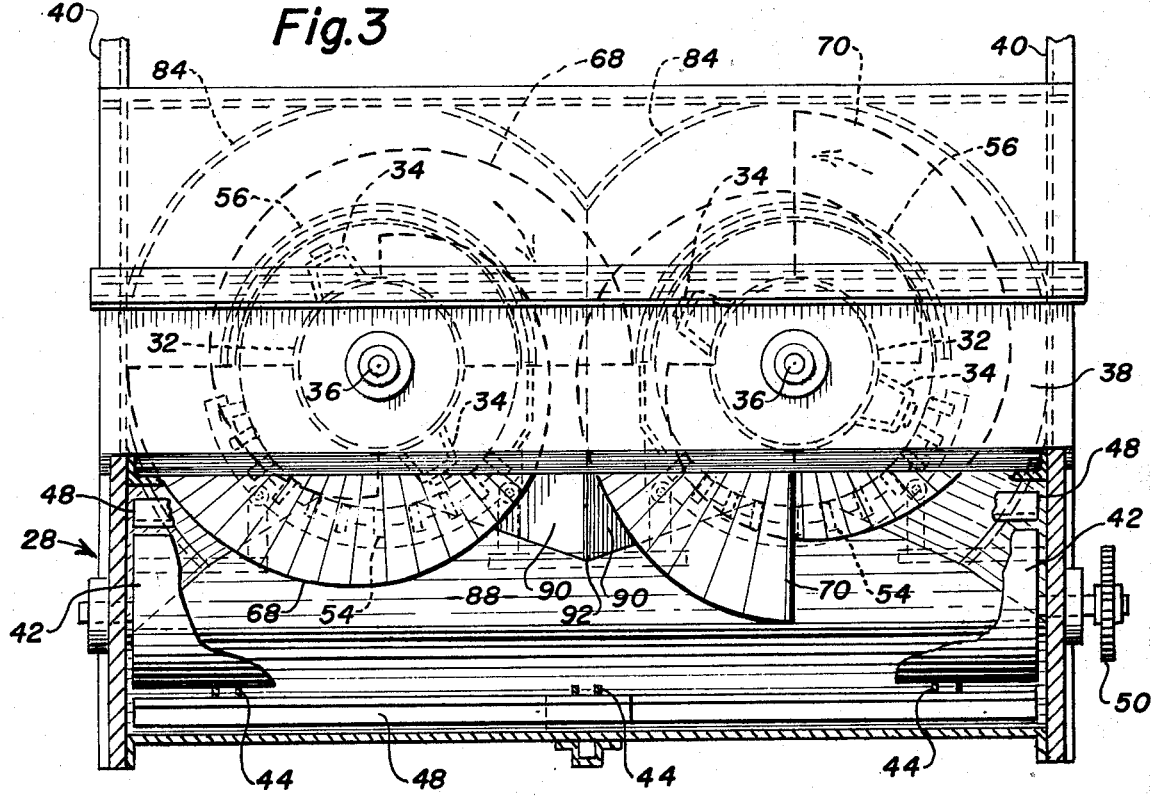
FIG. 3 is a fragmentary, substantially vertical elevation, partly in section, illustrating the portion of the harvester shown in FIGS. 1 and 2, as seen on the line 3—3 of FIG. 1.

The crop material is threshed between rotors 32, see FIGS. 2 and 3, which have a plurality of rasp bars 34 thereon which extend longitudinally thereof. The rotors 32 are tubular as readily can be seen from FIGS. 2 and 3 and the opposite ends thereof are supported by shafts 36 which extend through suitable bearings adjacent the opposite ends thereof, the forward bearings being supported by a front frame plate 38 which extends transversely between opposite sides of the main frame 40 of the machine, as illustrated in FIGS. 2 and 3.

The elevator 28, as shown partially, particularly in FIG. 2 and somewhat in FIG. 3, comprises an uppermost drive cylinder 42 around which a plurality of endless chains 44 extend for driving operation of said chains in the direction of the arrows shown in FIG. 1, said chains also extending around a forward supporting cylinder 46 which is shown in FIG. 1. A series of cross bars 48 which preferably have a length only approximately half that of the elevator 28 extend successively between the outermost chains 44 and the central chain 44 in staggered relationship to each other as clearly shown in FIG. 2. The drive cylinder 42 for the elevator is actuated by a sprocket gear 50 which is connected by a sprocket chain, not shown, extending to and actuated by the main drive mechanism of the combine which comprises a diesel engine 52 of substantial power.

The rotors 32 and rasp bars 34 thereon respectively rotate in opposite rotary directions as indicated by the direction arrows shown in FIG. 3. In particular, the rasp bars coact with concaves 54 which preferably are mounted in the lower portion of the elongated compartments respectively defined by elongated upper shields 56, shown in FIG. 3 and the concaves 54 which are curved and comprise the lower portions of said compartments. The concaves 54 have openings therethrough to permit the threshed grain, beans, or kernels of other kinds to fall therethrough and be received upon the grain pan 58, shown in FIG. 1, which is operated in conventional manner by driving mechanism, not shown, for purposes of permitting the grain to be sifted therethrough for engagement by the lower end of the elevator 22. Chaff is blown by blower 60 toward the rear of the combine for discharge therefrom after being engaged by the chaffer sieves 62 which also are shown in FIG. 1.

Referring to FIG. 2, it will be seen that the compartments defined in the upper portions thereof by the shields 56 are spaced transversely apart a predetermined distance, whereby it is contemplated that the combine comprising the present invention preferably can utilize rotors, shields and concaves of a substantially standard size which are capable of threshing a greater volume of crop material than normally is fed thereto by conventional feed means such as those employed in some of the prior devices, including those which are illustrated in the aforementioned patents. Therefor, the principle objective of the present invention is to feed a greater amount of crop material to said threshing mechanism than has been possible in utilizing the prior mechanisms for such purpose and, to accomplish this, the present invention utilizes a pair of frusto-conical augers 64 and 66 which comprise tapered, helical flights 68 and 70. The flights 68 and 70, as can best be seen from FIG. 2, spiral in opposite direction. Said augers are fixed rigidly to the forward ends of the rotors 32 which, as indicated above, are driven in opposite rotary direction by means such as the exemplary bevel gears 72, see FIG. 1, which are fixed to the inner ends of the shafts which are fixed centrally of the tubular rotors 32, as also indicated in dotted lines in FIG. 1. A drive shaft 74 which extends transversely of the rearward portion of the housing 10 of the combine, as shown in FIG. 1, has a pair of bevel gears 76 thereon which face each other, only one of said bevel gears being shown in FIG. 1. Thus, as the shaft 74 is driven by the main drive means of the combine as indicated in the several phantom endless belts or chains 78 and 79 shown in FIG. 1, will effect rotation of the rotors 32 and the augers 64 and 66 respectively fixed thereto in opposite rotary directions.

In order to achieve the additional feed capacity of the present invention, by referring to FIGS. 2 and 3, it will be seen that the outermost portions of the flights 68 and 70 of augers 64 and 66 have a greater radius then half the distance between the axes of the shafts 36. Accordingly, said outermost portions of the flights are arranged in overlapping but non-engaging relationship due to the positions in which the inner edges of the flights 68 and 70 are fixed to the cylindrical cores 80 for said augers, such as by welding, and the indexing of the augers as provided by the intermeshing bevel gears 72 and 76, shown in FIG. 1. Preferably, the cylindrical cores 80 of the augers are substantially a continuation of the rotors 32 which also are tubular and, by means of suitable discs or spiders 82, fixed to the interior of the cylindrical rotors 32, the actual supporting shafts 36 for said rotors and augers extend through appropriate openings in said discs or spiders 82 and are rigidly connected thereto, as can be seen in FIG. 1.

To insure intimate engagement of the spiral flights 68 and 70 of the conical augers 64 and 66 with the crop material which is advanced in undershot manner thereto, as can be seen from FIG. 1, there are provided a pair of similar partially conical extensions 84 which extend forwardly from a transverse frame plate 86, shown in FIG. 2, and flare outwardly therefrom toward the aforementioned front vertical frame plate 38. The conical flare of the extensions 84 is generally complementary to the frusto-conical periphery outline of the augers 64 and 66 but spaced slightly outwardly from the actual peripheral extremities of the flights of said augers so as to prevent metal-to-metal contact between the augers and extensions 84 which actually constitute an extension of the concave upper shields 56. The lower portions of said extensions 84 however conform to and are connected fixedly to an upwardly and inwardly inclined transverse guide plate 88, best shown in transverse section in FIG. 1 and also in FIG. 3 within the break between opposite ends of the drive cylinder 42 for the chains 44. The guide plate 88 provides a feed ramp at the underside of the augers and preferably is substantially flat and extends between opposite sides of the auger compartment 30 and is supported, for example, by the side plates 40 of the frame of the machine.

Referring to FIGS. 2 and 3, it also will be seen that the innermost adjacent portions 90 of said partially conical extensions 84 meet in a substantially vertical apex 92 due to the angular relationship of the adjacent portions 90 as best shown in FIG. 2. The apex 92, therefore, effectively divides the mass of crop material being delivered to the forward ends of the augers 64 and 66 and, due to the overlapping relationship of at least the forward portions of said auger, a greater mass of crop material may be effectively and forceably advanced by said augers respectively into the compartments defined by the shields 56 and concaves 54 by condensing the same and dividing the overall mass by the function of the apex 92. Further, it will be seen that a pair of spiral flights 68 and 70 are connected to the cylindrical cores 80 of each of the augers 64 and 66, thereby defining therebetween a spiral or helical space which progressively decreases in volume toward the inner end of said augers and, by cooperation with the complementary inner surfaces of the partially conical extensions 84, compression and consolidation of the crop material is effected to forcibly advance the same into the threshing mechanism comprising the rasp bars 34 and the concaves 54.

Due to the particular configuration of the conical augers 64 and 66 and the confining surfaces of the extensions 84 of the concave shields 56 and the inclined guide plate 88, there is no tendency for back-feeding of any of the crop material and all of the same is fed forwardly into the receiving end of the threshing mechanism described above. Also, particularly from FIG. 2, it is readily apparent that the pair of threshing rotors and associated concave shields 56 and concaves 54, which are of a substantially less diameter then the transverse dimension between the opposite sides 40 of the combine, and the much greater diameter of the outermost end portions of the conical augers 64 and 66, which diameter is greater than the transverse dimension between the opposite sides 40 of the frame of the combine, clearly illustrate the ability of the feeding mechanism of the present invention to effectively handle and thresh crop material in greater volume than is possible in conventional combines in which, for example, the augers are not appreciably greater in diameter then that of the threshing compartments of the combine. Moreover, even though the combined diameters of the largest ends of the conical augers 64 and 66 is greater than the width between the opposite sides 40 of the combine, the overlapping relationship of the outermost portions of the flights of said auger not only permits the accommodation of such greater diameters of augers within the combine but increases the positive engagement of the augers with the crop material being delivered thereto and it is the co-action of said pair of conical augers in said overlapping relationship that provides the possibility for said combine to handle and thresh such increased volumes of crop material as compared with the volumes capable of being handled by conventional combines.

While the invention has been described and illustrated in its several preferred embodiments, it should be understood, for example, that extensions could be added to the cylindrical flighting of an auger to achieve similar improved feeding by cooperatively overlapping and converging the configuration of such extensions. Thus, the invention is not to be limited to the precise details herein illustrated and described since the same may be carried out in other ways falling within the scope of the invention as illustrated and described.

I claim:
1. In an axial flow combine provided with:
   a. a casing including a forward portion having a front end and twin compartments in said casing,
   b. twin rotors respectively supported in said compartments upon substantially parallel shafts rotatable in opposite directions and having forward ends,
   c. rasp bars extending along said rotors,
   d. concaves respectively complementary to said rotors mounted within said compartments and cooperable with said rotors to effect threshing, and
   e. crop feeding means operable to deliver cut crop material to said front end of said casing; the improvement comprising in combination therewith:
   f. augers having flighting converging toward said compartments and spiralling in opposite directions mounted on the forward ends of said rotors and coacting with each other when rotated by said rotors to positively feed crop material to said rotors for threshing by coaction thereof with said rasp bars, said augers having forward overlapping portions, and
   g. means coordinating the rotation of said rotors to maintain said overlapping portions of said rotors in non-engaging operative registry with each other.

2. The combine according to claim 1 in which said augers are generally frusto-conical shape in configuration.

3. The combine according to claim 2 in which the forward overlapping portions of said frusto-conical augers have a radius greater than half the distance between the shafts of said twin rotors.

4. The combine according to claim 2 further including extensions on the forward ends of said compartments of said casing complementary in shape to the peripheries of at least the sides and upper surfaces described by said augers.

5. The combine according to claim 4 further including an upwardly and inwardly inclined guide plate for crop material extending across said forward end of said casing between said crop feeding means and the lower forward ends of said compartments of said casing, the incline of said guide plate being inclined in a complementary direction as the angle of the slope of said conical augers.

6. The combine according to claim 2 in which the angle between the opposite sides of the frusto-conical augers is substantially between 70° and 80° and the inner ends of said augers having a diameter substantially equal to the diameter of the shafts of said rotors.

7. The combine according to claim 2 in which the concaves of said combine are in the lower portions of the compartments of said casing and the upper portions of said compartments comprising elongated transversely curved shields complementary to the cylindrical surfaces generated by the rotation of said rasp bars upon said rotors, said shields and concaves being spaced transversely apart a limited distance, and said combine further including central guide means for crop material extending between and forwardly from the forward ends of said shields and concaves, said central guide means having angularly related sides terminated in a forward vertical apex to deflect crop material from said augers respectively into said shields and concaves.

8. The combine according to claim 7 in which said augers extend forwardly beyond said vertical apex of said central guide means and the portions of said augers which overlap being within those portions thereof which are forwardly of said apex of said central guide means.

9. The combine according to claim 1 in which the forward overlapping portions of said augers have a radius greater than half the distance between the shafts of said twin rotors.

* * * * *